(12) United States Patent (10) Patent No.: US 9,025,569 B2
Shim et al. (45) Date of Patent: May 5, 2015

(54) METHOD AND APPARATUS FOR ACQUIRING SYNCHRONIZATION IN CODE DIVISION MULTIPLE ACCESS SYSTEM

(71) Applicant: Samsung Electronics Co. Ltd., Suwon-si, Gyeonggi-do (KR)

(72) Inventors: Myung-Joon Shim, Suwon-si (KR); Seung-Hwan Won, Hanam-si (KR); Sang-Won Choi, Yongin-si (KR); Jong-Gun Moon, Suwon-si (KR); Jong-Yoon Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 13/937,430

(22) Filed: Jul. 9, 2013

(65) Prior Publication Data

US 2014/0254562 A1 Sep. 11, 2014

(30) Foreign Application Priority Data

Mar. 11, 2013 (KR) ........................ 10-2013-0025631

(51) Int. Cl.
*H04W 56/00* (2009.01)
(52) U.S. Cl.
CPC ..................... *H04W 56/00* (2013.01)

(58) Field of Classification Search
USPC .................. 370/335, 342, 350, 458, 441, 512
See application file for complete search history.

(56) References Cited

U.S. PATENT DOCUMENTS

| 6,654,432 B1 * | 11/2003 | O'Shea et al. | ............... 375/354 |
| 7,894,554 B2 * | 2/2011 | Kim et al. | ................ 375/343 |
| 2009/0116470 A1 * | 5/2009 | Berggren | ..................... 370/342 |

* cited by examiner

*Primary Examiner* — Thai Nguyen
(74) *Attorney, Agent, or Firm* — Jefferson IP Law, LLP (57) ABSTRACT

A method and an apparatus for acquiring downlink frame synchronization are provided. The method includes phase-rotating a mid-amble of a first Time Slot (TS) of a received sub-frame within an area and estimating a Channel Impulse Response (CIR), calculating a Maximum Likelihood (ML) between a downlink synchronization code of the received sub-frame and a downlink synchronization code generated in a terminal by using the estimated CIR, correlating downlink synchronization codes of a plurality of sub-frames and the downlink synchronization code generated and calculating ML values of the plurality of sub-frames with respect to the plurality of sub-frames corresponding to M Transmission Time Intervals (TTIs), and calculating hypothesis values of hypotheses according to a frequency interval and a phase offset of the generated downlink synchronization code based on the calculated ML values of the plurality of sub-frames and drawing a frequency offset and a hypothesis corresponding to a maximum value.

22 Claims, 5 Drawing Sheets

METHOD AND APPARATUS FOR ACQUIRING SYNCHRONIZATION IN CODE DIVISION MULTIPLE ACCESS SYSTEM

PRIORITY

This application claims the benefit under 35 U.S.C. §119 (a) of a Korean patent application filed on Mar. 11, 2013 in the Korean Intellectual Property Office and assigned Serial No. 10-2013-0025631, the entire disclosure of which is hereby incorporated by reference.

BACKGROUND OF THE INVENTION

1. Field of the Invention

The present invention relates to a Code Division Multiple Access (CDMA) system. More particularly, the present invention relates to a method and an apparatus for acquiring frame synchronization in a CDMA system.

2. Description of the Related Art

A Time Division Duplex (TDD) scheme is applied to a CDMA system, and the CDMA system based on the TDD scheme can use the same frequency band shared by both a downlink and an uplink and freely control and operate data capacities thereof by changing allocation of Time Slots (TSs) depending on the situation. Among such systems, Time Division Synchronous Code Division Multiple Access (TD-SCDMA) has been commercialized and is currently used in China.

Figure 1:
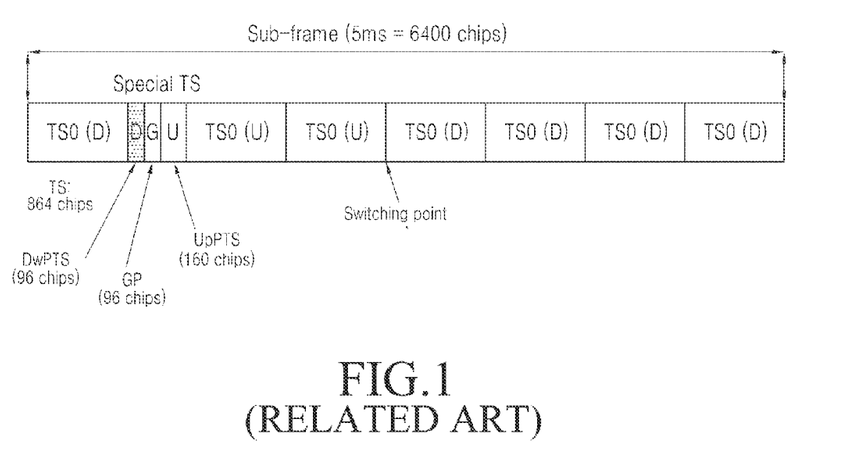
FIG. 1 illustrates a structure of a sub-frame used in a Time Division Synchronous Code Division Multiple Access (TD-SCDMA) according to the related art.

FIG. 1 illustrates a structure of a sub-frame used in TD-SCDMA according to the related art.

Referring to FIG. 1, one sub-frame includes seven TSs having the same length for data transmission and a Special Time Slot (STS). The STS is used to distinguish between the downlink and the uplink, and includes a Downlink Pilot Time Slot (DwPTS), a Guard Period (GP), and an Uplink Pilot Time Slot (UpPTS). The DwPTS and the UpPTS include information for physical transmission synchronization. For example, a sequence for synchronization of forward link transmission is transmitted in a DwPTS field and a sequence for synchronization of reverse link transmission is transmitted in an UpPTS field. The TS in which data transmission is performed includes a data symbol interval and a mid-amble, wherein user data is included in the data symbol interval and pilot signal information for a channel estimation is included in the mid-amble. In general, TS0 is mainly used for data transmission for a broadcasting channel within a cell, and TS1 to TS6 are used for forward or reverse data transmission. D and U within each TS block refer to the downlink and the uplink, respectively.

Figure 2:
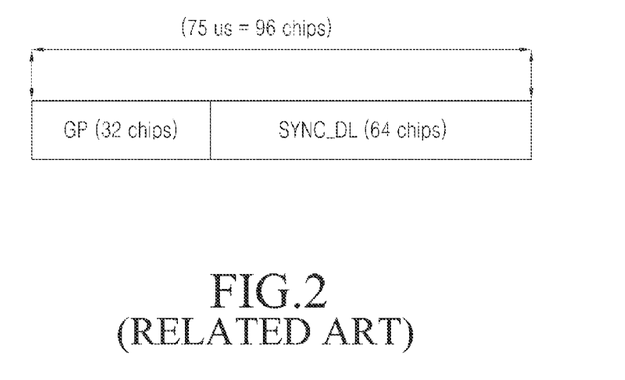
FIG. 2 illustrates a structure of a Downlink Pilot Time Slot (DwPTS) used for initial synchronization acquisition in a downlink according to the related art.

FIG. 2 illustrates a structure of a DwPTS used for initial synchronization acquisition in a downlink according to the related art.

Referring to FIG. 2, the DwPTS includes GP and SYNC-DL codes. The SYNC-DL code is transmitted with constant power and is not spread. Power of a SYNC-DL sequence is determined by higher layer signaling.

When the CDMA system based on the TDD scheme is initially driven, initial synchronization acquisition is necessary. The initial synchronization acquisition generally includes three operations described below and may be embodied in various types according to the implementation.

Operation 1: Search of the DwPTS and Identification of the SYND-DL Sequence.

A SYNC-DL sequence index is determined by performing slot synchronization by using the SYNC-DL sequence in the DwPTS in a Second TS (STS) of one sub-frame. This is determined through a comparison between a threshold and a maximum value among 32×6400 hypotheses acquired by performing a correlation through a matched filter. At this time, it may be required to acquire a plurality of hypotheses in consideration of several cells and the number of effective multi-path for each cell.

Operation 2: Identification of Scrambling and Basic Mid-Amble Codes.

A corresponding mid-amble code group can be known from the SYNC-DL sequence acquired in the first operation, and a corresponding mid-amble code is identified among four basic mid-amble codes included in the group. The identified mid-amble code is equally used during one sub-frame. Further, since a relation between the mid-amble code and the scrambling code corresponds to a one-to-one correspondence mapping relation, when the mid-amble code is determined, the scrambling code is automatically determined. A correlation between the mid-amble code and the scrambling code is shown in Table 1 below.

TABLE 1

| | Associated Codes | | | |
|---|---|---|---|---|
| Code Group | SYNC-DL ID | SYNC-UL ID | Scrambling Code ID | Basic Mid-amble Code ID |
| Group 1 | 0 | 0 ... 7 | 0 | 0 |
| | | | 1 | 1 |
| | | | 2 | 2 |
| | | | 3 | 3 |
| Group 2 | 1 | 8 ... 15 | 4 | 4 |
| | | | 5 | 5 |
| | | | 6 | 6 |
| | | | 7 | 7 |
| . | | | | |
| . | | | | |
| Group 32 | 31 | 248 ... 255 | 124 | 124 |
| | | | 125 | 125 |
| | | | 126 | 126 |
| | | | 127 | 127 |

Operation 3: Control Multi-Frame Synchronization.

A phase of a channel value through a mid-amble of a Primary-Common Control Physical CHannel (P-CCPCH) is reflected to the SYNC-DL, and a position of a control multi-frame is determined by using information on a phase of the DwPTS.

Operation 4: Broadcasting Channel (BCH) Decoding.

When a CRC becomes "Good" through demodulation of the BCH, all the operations are successfully completed and general communication starts. Such an operation may not be included in an initial synchronization process.

Meanwhile, in the CDMA system based on the TDD scheme, channels related to initial synchronization having the structure shown in FIG. 1 are periodically received. More particularly, since the SYNC-DL including 64 chips is received every 5 ms interval in TD-SCDMA, the TD-SCDMA system has relatively low detection capabilities in comparison with Wide-band Code Division Multiple Access (W-CDMA)/Frequency Division Duplex (FDD) systems in which initial synchronization is acquired using successively received pilot channels.

Meanwhile, since the BCH has a Transmission Time Interval (TTI) of 20 ms (one TTI=four sub-frames) in the TD-SCDMA system, a terminal should identify whether there is the BCH in a next frame and find a start position of the TTI. In order to inform of the start position of the BCH, a base station performs phase modulation based on the phase of the mid-amble of the first time slot (i.e., a time-slot 0) when modulating the DwPCH and a phase modulation value equally remains during one sub-frame. Four phase modulation values acquired during four successive sub-frames are referred to as "phase quadruple", and there are two types of phase quadruple, such as S1 and S2. Table 2 below shows meanings of S1 and S2. In Table 2, the P-CCPCH is a physical channel into which the BCH corresponding to a transport channel is mapped.

TABLE 2

| Case | Phase quadruple | Meaning |
|---|---|---|
| S1 | 135, 45, 225, 135 | The P-CCPCH is in next four sub-frames. |
| S2 | 315, 225, 315, 45 | The P-CCPCH is not in next four sub-frames. |

A frame synchronization acquisition searcher performing the third operation of the initial synchronization acquisition estimates the "phase quadruple" during four sub-frames and determines whether the estimated "phase quadruple" corresponds to S1 or S2. When the estimated "phase quadruple" corresponds to S1, the frame synchronization acquisition searcher determines that there is the P-CCPCH in a next sub-frame and starts receiving the BCH transmitted through the P-CCPCH. At this time, the process of estimating the "phase quadruple" includes a process of estimating a phase modulation value of a downlink SYNC-DL for each sub-frame. A method of the related art for performing the process is largely classified into the following two methods.

(1) A method of applying arctangent to a phase value of an estimated downlink synchronization code and performing hard decision.

(2) A method of calculating a correlation by using estimated phase values of the received mid-amble code and downlink synchronization code and using an inner product with a reference vector.

The method of (1) first estimates the phase value through a complex multiplication of the received downlink synchronization code and the synchronization code already known to the terminal Thereafter, a modulated phase of the downlink synchronization code is calculated by applying arctangent and hard decision is performed. Thereafter, "phase quadruple" corresponding to the modulated phase value during four sub-frames is compared with S1 and S2. As a result of the comparison, when "phase quadruple" corresponds to S1, the BCH is received in four following sub-frames. When "phase quadruple" does not correspond to S1, it is determined that there is no BCH in the four following sub-frames, so that the process of estimating "phase quadruple" is continuously repeated. However, for efficient implementation, the method of estimating the modulated phase value of the downlink synchronization code by using arctangent generally replaces the operation of arctangent with table mapping by a look up table. Accordingly, since a lot of table values should be stored in a memory for the accurate operation, the memory is excessively increased. Further, the modulated phase value of the downlink synchronization code may be distorted by a frequency offset and channel, and significantly degrades accuracy of a result estimated through the method particularly in an environment where a level of the received signal is low. Accordingly, in the method using the phase of the downlink synchronization code by the hard decision, calculation of the accurate phase modulation value is difficult.

The method of (2) uses a correlation value between the received signal and the reference vector by using the reference vector for the phase in order to address the issues of method of (1). Further, the method of (2) performs a frame synchronization estimation in consideration of all available phase modulation possibilities and the frequency offset. Specifically, with respect to M successive sub-frames transmitted from the base station, a phase difference between the downlink synchronization code and the mid-amble code included in each sub-frame is acquired. Thereafter, a complex inner product of the reference vector corresponding to a vector expression of M reference phase values and the phase vector corresponding to a vector expression of phase differences acquired for the M successive sub-frames, and the frame synchronization is estimated using the calculated inner value. When the frame synchronization is estimated by the calculated inner value, a threshold may vary depending on existence or non-existence of the frequency offset or size of the frequency offset.

The method of (2) has a condition based on a frequency offset value generated in a multi-path fading channel, and the frequency offset should be estimated in advance to determine the condition. Further, a frequency offset estimation value should be compared with a reference value. When the estimation value and the reference value are similar to each other, thresholds used herein may be relatively inaccurate values. In addition, when the frequency offset is estimated through a general method in the TDD system, it takes a lot of time corresponding to a minimum of dozens to over one hundred sub-frames according to accuracy of the frequency offset. In analyzing a convergence degree of the frequency offset under various multi-path environments, the frequency offsets converge on significantly different values behind a specific observation section, and one reference value has a difficulty in satisfying the various multi-path environments. Accordingly, "phase quadruple" estimated in an actual environment through the method degrades the accuracy.

Further, the two methods degrade detection capabilities in an area, such as a cell boundary, and have a high probability of generating a false alarm according to the channel and residual frequency offset values. Accordingly, the time corresponding to a minimum of 50 sub-frames should be additionally used for residual frequency offset compensation to successfully decode the BCH.

Therefore, a need exists for a method and an apparatus for acquiring efficient initial frame synchronization and for estimating a residual frequency offset in a CDMA downlink system based on a TDD scheme.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for acquiring efficient initial frame synchronization and for estimating a residual frequency offset in a Code Division Multiple Access (CDMA) downlink system based on a Time Division Duplex (TDD) scheme.

In accordance with an aspect of the present invention, a method of acquiring downlink frame synchronization in a code division multiple access mobile communication system is provided. The method includes phase-rotating a mid-amble of a first Time Slot (TS) of a received sub-frame within an area and estimating a Channel Impulse Response (CIR), calculating a Maximum Likelihood (ML) between a downlink synchronization code of the received sub-frame and a downlink synchronization code generated in a terminal by using the estimated CIR, correlating downlink synchronization codes of a plurality of sub-frames and the downlink synchronization code generated in the terminal and calculating ML values of the plurality of sub-frames with respect to the plurality of sub-frames corresponding to M Transmission Time Intervals (TTIs), calculating hypothesis values of hypotheses according to a frequency interval and a phase offset of the generated downlink synchronization code based on the calculated ML values of the plurality of sub-frames and drawing a frequency offset and a hypothesis corresponding to a maximum value among the calculated hypothesis values, and comparing the maximum value of the ML values with a threshold and determining that frame synchronization acquisition is successful when the maximum value is larger than the threshold and the drawn hypothesis is included in a hypothesis indicating successful synchronization acquisition.

In accordance with another aspect of the present invention, an apparatus for acquiring downlink frame synchronization in a code division multiple access mobile communication system is provided. The apparatus includes a CIR estimator configured to phase-rotate a mid-amble of a first TS of a received sub-frame within an area and estimates a CIR, an ML value calculator configured to calculate an ML between a downlink synchronization code of the received sub-frame and a downlink synchronization code generated in a terminal by using the estimated CIR, and configured to correlate downlink synchronization codes of a plurality of sub-frames and the downlink synchronization code generated in the terminal and calculate ML values of the plurality of sub-frames with respect to the plurality of sub-frames corresponding to M TTIs, a frequency offset and hypothesis estimator configured to calculate hypothesis values of hypotheses according to a frequency interval and a phase offset of the generated downlink synchronization code based on the calculated ML values of the plurality of sub-frames and configured to draw a frequency offset corresponding to a maximum value among the calculated hypothesis values and a hypothesis, and a post processor configured to compare the maximum value of the ML values with a threshold and determine that frame synchronization acquisition is successful when the maximum value is larger than the threshold and the drawn hypothesis is included in a hypothesis indicating successful synchronization acquisition.

According to an embodiment of the present invention, it is possible to guarantee a high residual frequency offset detection capability even in a significantly large residual frequency offset state and perform a faster Broadcasting Channel (BCH) decoding by reducing the residual frequency offset with the use of a residual frequency offset estimation function.

Other aspects, advantages, and salient features of the invention will become apparent to those skilled in the art from the following detailed description, which, taken in conjunction with the annexed drawings, discloses various embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of various embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In a Code Division Multiple Access (CDMA) based system, all channels are distinguished by a channelization code, and information on the cell can be acquired through reception of control related information transmitted from the base station. Accordingly, the terminal requires acquisition of information on initial synchronization of the desired cell to acquire the control related information. Further, since there is a channel including information for initial synchronization acquisition in a specific Time Slot (TS), the Time Division Duplex (TDD) system should perform an initial synchronization acquisition process by acquiring timing of a pilot sequence, such as the SYNC-DL code of Time Division Synchronous Code Division Multiple Access (TD-SCDMA) periodically transmitted and a code IDentification (ID).

Figure 3:
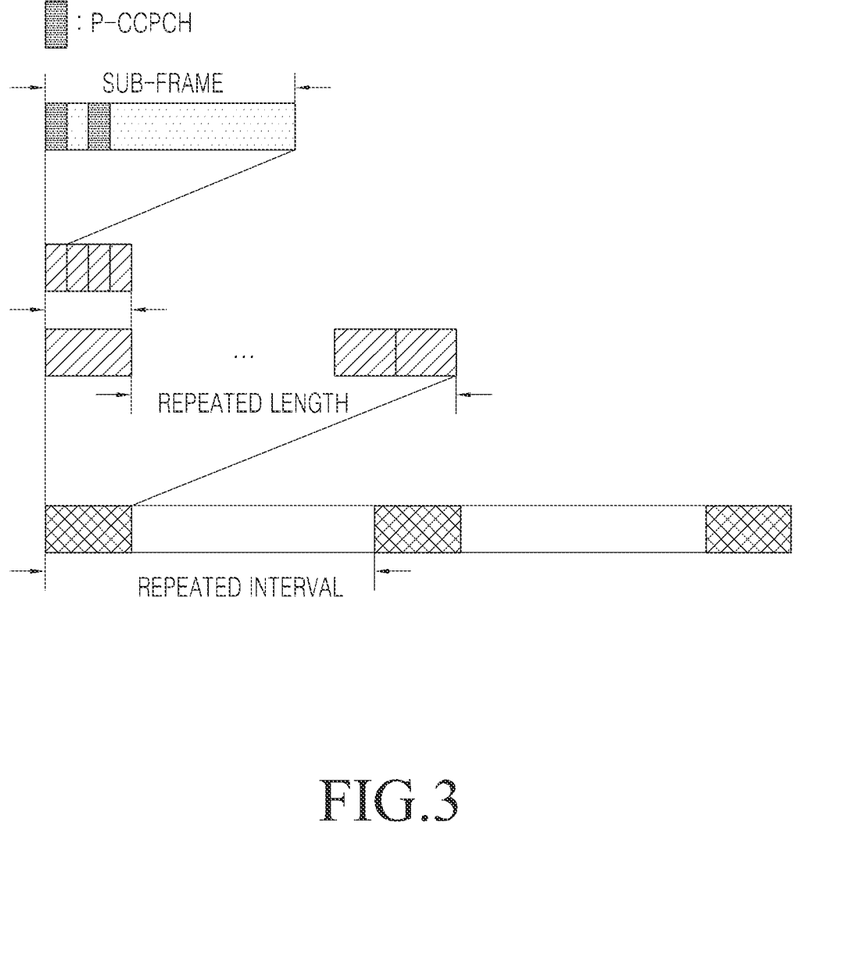
FIG. 3 illustrates a Primary-Common Control Physical CHannel (P-CCPCH) transmission type according to an embodiment of the present invention.

FIG. 3 illustrates a Primary-Common Control Physical CHannel (P-CCPCH) transmission type according to an embodiment of the present invention.

Referring to FIG. 3, a frame synchronization acquisition searcher acquires frame synchronization based on phase information carried on a SYNC-DL signal transmitted for each sub-frame and determines whether there is the P-CCPCH in four following sub-frames. A multi-path searcher estimates a position of a Channel Impulse Response (CIR) through a basic mid-amble index of time slot 0 detected in the second operation and estimates a channel phase in the position. Further, a reference SYNC-DL signal is made through convolution with the local SYNC-DL signal estimated in the first operation. By taking Maximum Likelihood (ML) between the made reference SYNC-DL signal and the received SYNC-DL signal, phase information of the received SYNC-DL signal can be acquired. The phase information of the SYNC-DL signal transmitted in every sub-frame is compared with S1 and S2 of Table 2. When the phase information corresponds to S1, it is determined that a next transmitted sub-frame is a first sub-frame of one Transmission Time Interval (TTI) (=four sub-frames).

In general, P-CCPCH transmission is periodically generated. Further, in principle, the P-CCPCH is repeatedly transmitted by the number of times in each cycle, and matters, such as a repeated interval and a repeated length, are determined by higher layer signaling. Table 3 shows common TS information, and FIG. 3 illustrates a transmission form of the P-CCPCH using the common TS information.

TABLE 3

| Information Element/Group name | Type and reference | Semantics description |
| --- | --- | --- |
| Repeated interval | Integer (1, 2, 4, 8, 16, 32, 64) | Default is continuous allocation. Value 1 indicate continuous |
| Repeated length | Integer (1 . . . Repetition period −1) | NOTE: This is empty if repetition period is set to 1. |

Thereafter, the frame synchronization acquisition searcher according to an embodiment of the present invention will be described.

The frame synchronization acquisition searcher uses a phase of the SYNC-DL code included in every sub-frame to determine whether there is the P-CCPCH coded over one TTI. As described above, it can be determined whether the P-CCPCH exists according to a phase pattern of the SYNC-DL code, and the phase pattern is made over a total of four sub-frames, so that it takes a minimum of one TTI time for frame synchronization acquisition. In order to improve the detection capability, the frame synchronization can be detected using a time corresponding to a multiple of the TTI. However, when the observation section increases, the number of hypotheses according to the phase pattern increases in proportion to the increase of the observation section. For example, when the number of hypotheses is "N" in one TTI, the number of hypotheses increases two times, that is, "2N" in two TTIs. Accordingly, it is possible to control the capability of the frame synchronization acquisition searcher by using various TTI sections.

Figure 4:
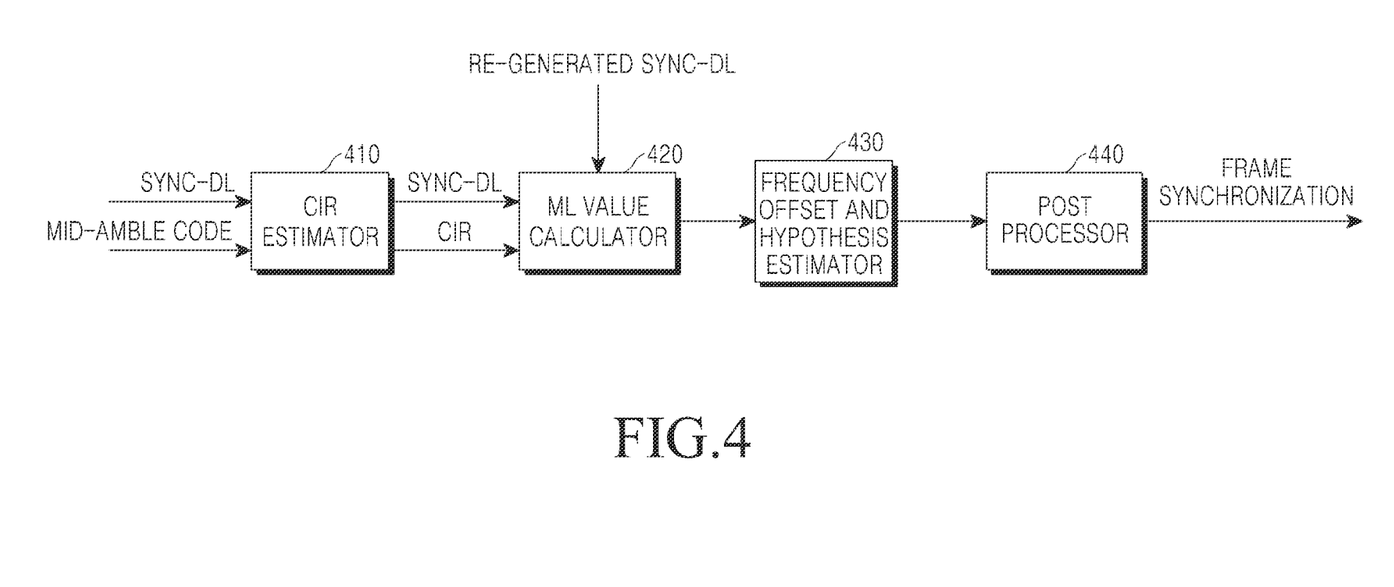
FIG. 4 illustrates a configuration of a frame synchronization acquisition searcher according to an embodiment of the present invention.

FIG. 4 illustrates a configuration of a frame synchronization acquisition searcher according to an embodiment of the present invention.

Referring to FIG. 4, the frame synchronization acquisition searcher includes a CIR estimator 410, an ML value calculator 420, a frequency offset and hypothesis estimator 430, and a post processor 440.

The CIR estimator 410 phase-rotates the received mid-amble of time slot 0 within −/+X [Hz] area at regular frequency intervals and estimates the CIR. The MR value calculator 420 calculates an ML value between the received SYNC-DL code of the sub-frame and the SYNC-DL code according to four phases generated in a local generator (not shown) by using the estimated CIR, correlates the generated SYNC-DL and the received SYNC-DL, and calculates the ML value of the corresponding sub-frame. Accordingly, ML values are calculated by performing such a process over a total of M TTIs. The frequency offset and hypothesis estimator 430 operates a total of $(2*X/Y+1)*M*N$ hypothesis values according to hypotheses by a frequency interval Y and a phase offset value of the SYNC-DL code determined based on the calculated ML values and draws a frequency and a hypothesis corresponding to a maximum value among the hypothesis values. Further, the frequency offset and hypothesis estimator 430 generates reference phase offset sets within a +/−X[Hz] range by using the CIR and estimates a residual frequency offset by using the generated reference phase offset sets. The post processor 440 compares an estimation result of the frequency offset and hypothesis estimator 430 with a preset hypothesis to determine whether to end the frame synchronization acquiring process. Further, according to a result of the determination of the post processor 440, a controller (not shown) for controlling re-performance of some or all of the synchronization acquiring processes may be further included. For example, when the maximum value of the ML values is equal to or smaller than a threshold, the controller corrects the residual frequency offset by an Auto Frequency Control (AFC), and controls calculation of the ML values through the ML value calculator 420. When the maximum value of the ML values exceeds the threshold, the controller identifies whether the drawn hypothesis is included in the hypothesis indicating successful synchronization acquisition. When the drawn hypothesis is included in the hypothesis indicating the successful synchronization acquisition, the controller determines that the synchronization acquisition is successful. When the drawn hypothesis is not included in the hypothesis indicating the successful synchronization acquisition, the controller identifies whether the number of times that the synchronization is attempted exceeds the number of times. When the number of times that the synchronization is attempted does not exceed the number of times, the controller controls the residual frequency offset by the AFC and controls the ML value calculator 420 to re-calculate the ML values.

Figure 5:
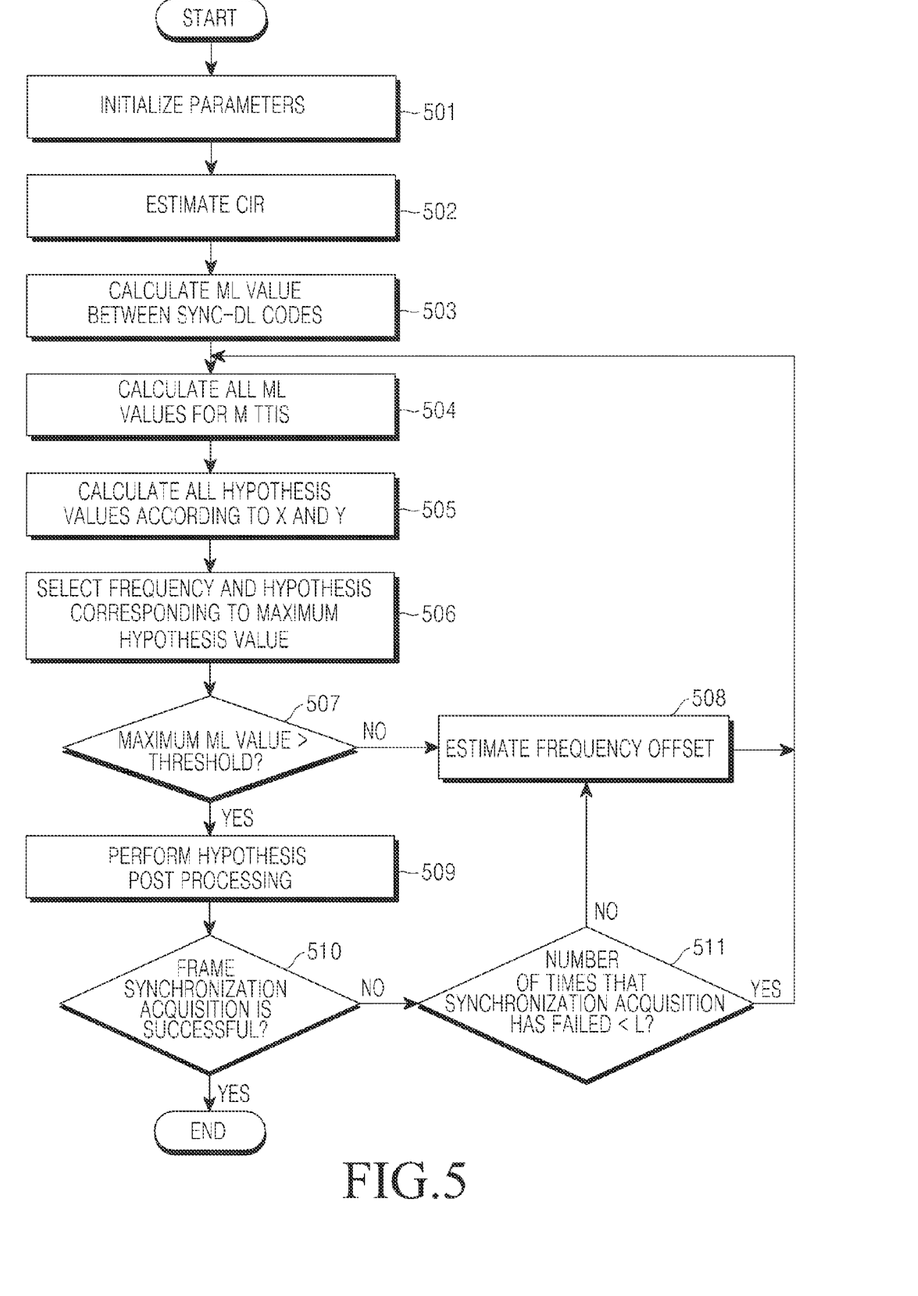
FIG. 5 is a flowchart illustrating a frame synchronization acquiring process according to an embodiment of the present invention.

FIG. 5 is a flowchart illustrating a frame synchronization acquiring process according to an embodiment of the present invention.

Referring to FIG. 5, initial input parameters M, N, X, Y, and L are initialized at operation 501. M refers to the number of sub-frames calculating ML values for frame synchronization acquisition, N refers to the number of hypotheses corresponding to one TTI, X refers to a range within which a phase rotation is performed, Y refers to a frequency interval, and L refers to the maximum number of times that frame synchronization acquisition is performed. At operation 502, the received mid-amble of time slot 0 is phase-rotated within a −/+X [Hz] area at regular frequency intervals and the CIR is estimated. At operation 503, an ML value of a corresponding sub-frame is calculated by correlating the received SYNC-DL and the SYNC-DL code according to four phases generated in a local generator by using the estimated CIR.

Figure 6A:
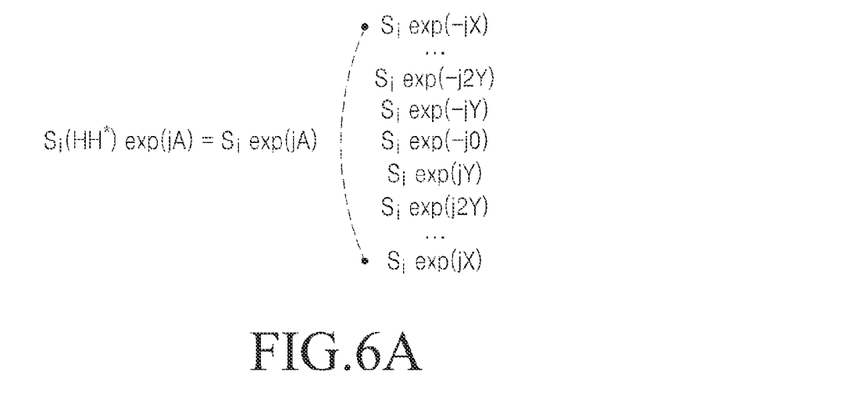
FIGS. 6A to 6C illustrate a method of calculating a Maximum Likelihood (ML) value for frame synchronization acquisition according to an embodiment of the present invention.
Figure 6B:
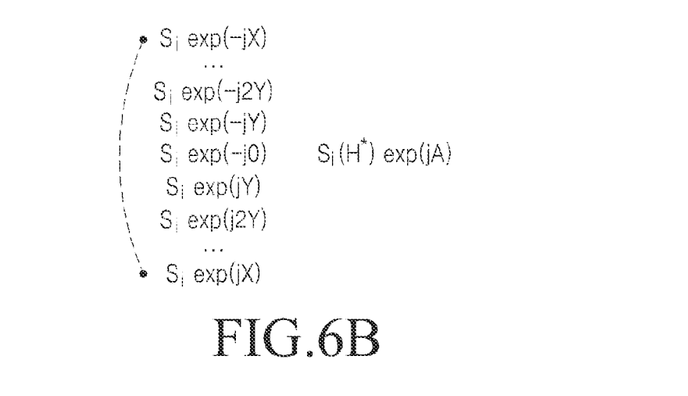
Figure 6C:
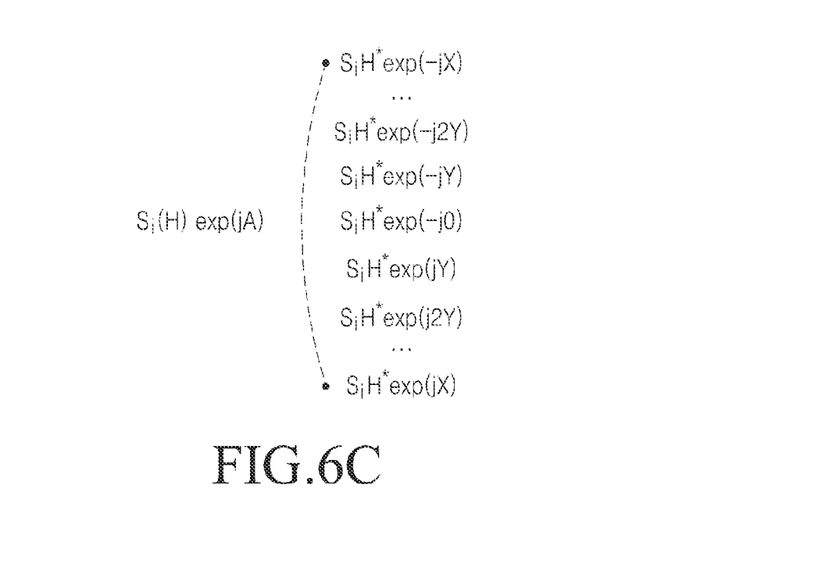

FIGS. 6A to 6C illustrate a method of calculating a Maximum Likelihood (ML) value for frame synchronization acquisition according to an embodiment of the present invention.

Referring to FIGS. 6A to 6C, the ML value of the sub-frame can be calculated through one of the following three methods.

(1) A method of calculating the ML value by correlating the received SYNC-DL including the residual frequency offset where a channel effect is offset and SYNC-DL values generated with reflection of reference phase offset sets generated within the +/−X[Hz] range (FIG. 6A).

(2) A method of calculating the ML value by reflecting reference phase offset sets generated within the +/−X[Hz] range to the received SYNC-DL signal via the channel and correlating the SYNC-DL signal and the SYNC-DL value re-generated using the CIR (FIG. 6B).

(3) A method of calculating the ML value by correlating values generated by applying the reference phase offset sets generated within the +/−X[Hz] range to the SYNC-DL value re-generated using the CIR and the received SYNC-DL (FIG. 6C).

Further, in addition to the three methods, other methods of calculating the ML value by applying the reference phase offset sets generated within the +/−X[Hz] range in a similar way may be used.

At operation 504, all ML values are calculated by performing the processes executed at operation 503 over a total of M TTIs.

At operation 505, a total of $(2*X/Y+1)*M*N$ hypotheses are operated according to hypotheses by the frequency interval Y and the phase offset of the SYNC-DL code based on the ML value calculated at operation 504, and a frequency and a hypothesis corresponding to a maximum ML value are drawn at operation 506. The maximum ML value is compared with a threshold at operation 507. When the maximum ML value exceeds the threshold, the process proceeds to operation 509 in which hypothesis post processing is performed. When the maximum ML value does not exceed the threshold, it is determined that the residual frequency offset is still large, so that the process proceeds to operation 508 in which the residual frequency offset is corrected by the AFC, and returns to operation 504. After the hypothesis post processing is performed at operation 509, it is identified whether the estimated hypothesis is included in the hypothesis indicating successful synchronization acquisition at operation 510. When the hypothesis is included in the hypothesis indicating the successful synchronization acquisition, it is determined that the frame synchronization acquisition is successful and thus, the frame synchronization acquisition process ends. At this time, a position of a frame boundary varies according to the phase offset of the SYNC-DL code, and the frame synchronization acquisition is completed after a corresponding offset of a sub-frame length according to each combination. When the hypothesis is not included in the hypothesis indicating the successful synchronization acquisition, it is identified whether the total number of times that the synchronization acquisition is attempted exceeds L times at operation 511. When the number of times that the synchronization acquisition is attempted does not exceed L times, a sub-frame length corresponding to the phase offset of the SYNC-DL code is allowed to pass and the process returns to operation 504 to calculate again the ML values over M TTIs. Further, when the total number of times that the synchronization acquisition is attempted exceeds L times at operation 511, it is determined as an estimation error by the residual frequency offset and the process returns to operation 508.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of acquiring downlink frame synchronization in a code division multiple access mobile communication system, the method comprising:
    phase-rotating a mid-amble of a first Time Slot (TS) of a received sub-frame within an area and estimating a Channel Impulse Response (CIR);
    calculating a Maximum Likelihood (ML) between a downlink synchronization code of the received sub-frame and a downlink synchronization code generated in a terminal by using the estimated CIR;
    correlating downlink synchronization codes of a plurality of sub-frames corresponding to M Transmission Time Intervals (TTIs) and the downlink synchronization code generated in the terminal and calculating ML values of the plurality of sub-frames;
    calculating hypothesis values of hypotheses according to a frequency interval and a phase offset of the downlink synchronization code generated in the terminal based on the calculated ML values of the plurality of sub-frames and drawing a frequency offset and a hypothesis corresponding to a maximum value among the calculated hypothesis values; and
    comparing a maximum value of the ML values with a threshold and determining that frame synchronization acquisition is successful when the maximum value of the ML values is larger than the threshold and the drawn hypothesis is included in a hypothesis indicating successful synchronization acquisition.

2. The method of claim 1, wherein the calculating of the ML between the downlink synchronization code of the received sub-frame and the downlink synchronization code generated in the terminal comprises calculating the ML by correlating the downlink synchronization code of the received sub-frame and the downlink synchronization code generated in the terminal, which reflects a reference phase offset generated within the area.

3. The method of claim 1, wherein the calculating of the ML between the downlink synchronization code of the received sub-frame and the downlink synchronization code generated in the terminal comprises calculating the ML by reflecting a reference phase offset generated within the area to the downlink synchronization code of the received sub-frame and correlating the downlink synchronization code of the received sub-frame and the downlink synchronization code generated in the terminal.

4. The method of claim 1, wherein the calculating of the ML between the downlink synchronization code of the received sub-frame and the downlink synchronization code generated in the terminal comprises calculating the ML by reflecting a reference phase offset generated within the area to the downlink synchronization code generated in the terminal and correlating the downlink synchronization code generated in the terminal and the downlink synchronization code of the received sub-frame.

5. The method of claim 1, wherein the hypothesis values are calculated by an equation of $(2*X/Y+1)*M*N$, in which X denotes an area where a phase rotation is performed, Y denotes a frequency interval, and N denotes a number of hypotheses corresponding to one TTI.

6. The method of claim 1, further comprising:
controlling a residual frequency offset by reflecting the drawn frequency offset.

7. The method of claim 1, wherein, when the maximum value of the ML values is equal to or smaller than the threshold, a residual frequency offset is controlled and the method returns to estimating the CIR.

8. The method of claim 1, wherein, after it is determined that the frame synchronization acquisition is successful, the frame synchronization acquisition is completed after a length corresponding to the frequency offset in a corresponding sub-frame.

9. The method of claim 1, wherein, when the drawn hypothesis is not included in the hypothesis indicating the successful synchronization acquisition, it is determined that the frame synchronization acquisition has failed and the method returns to calculating the ML values of the plurality of sub-frames after a length corresponding to the frequency offset in a corresponding sub-frame.

10. The method of claim 9, wherein, when the drawn hypothesis is not included in the hypothesis indicating the successful synchronization acquisition, it is identified whether a number of times that the synchronization acquisition is attempted exceeds a number of times, and it is determined that the frame synchronization acquisition has failed when the number of times that the synchronization acquisition is attempted exceeds the number of times.

11. The method of claim 10, wherein, when the number of times that the synchronization acquisition is attempted does not exceed the number of times, the method returns to calculating the ML values of the plurality of sub-frames.

12. An apparatus for acquiring downlink frame synchronization in a code division multiple access mobile communication system, the apparatus comprising:
a Channel Impulse Response (CIR) estimator configured to phase-rotate a mid-amble of a first Time Slot (TS) of a received sub-frame within an area and estimate a CIR;
a Maximum Likelihood (ML) value calculator configured to calculate an ML between a downlink synchronization code of the received sub-frame and a downlink synchronization code generated in a terminal by using the estimated CIR, and configured to correlate downlink synchronization codes of a plurality of sub-frames corresponding to M Transmission Time Intervals (TTIs) and the downlink synchronization code generated in the terminal and calculate ML values of the plurality of sub-frames;
a frequency offset and hypothesis estimator configured to calculate hypothesis values of hypotheses according to a frequency interval and a phase offset of the downlink synchronization code generated in the terminal based on the calculated ML values of the plurality of sub-frames and configured to draw a frequency offset corresponding to a maximum value among the calculated hypothesis values and a hypothesis; and
a post processor configured to compare a maximum value of the ML values with a threshold and determine that frame synchronization acquisition is successful when the maximum value of the ML values is larger than the threshold and the drawn hypothesis is included in a hypothesis indicating successful synchronization acquisition.

13. The apparatus of claim 12, wherein the ML value calculator calculates the ML between the downlink synchronization code of the received sub-frame and the downlink synchronization code generated in the terminal by correlating the downlink synchronization code of the received sub-frame and the downlink synchronization code generated in the terminal, which reflects a reference phase offset generated with the area.

14. The apparatus of claim 12, wherein the ML value calculator calculates the ML between the downlink synchronization code of the received sub-frame and the downlink synchronization code generated in the terminal by reflecting a reference phase offset generated within the area to the downlink synchronization code of the received sub-frame and correlating the downlink synchronization code of the received sub-frame and the downlink synchronization code generated in the terminal.

15. The apparatus of claim 12, wherein the ML value calculator calculates the ML between the downlink synchronization code of the received sub-frame and the downlink synchronization code generated in the terminal by reflecting a reference phase offset generated within the area to the downlink synchronization code generated in the terminal and correlating the downlink synchronization code generated in the terminal and the downlink synchronization code of the received sub-frame.

16. The apparatus of claim 12, wherein the frequency offset and hypothesis estimator calculates the hypotheses according to an equation of $(2*X/Y+1)*M*N$, in which X denotes an area where a phase rotation is performed, Y denotes a frequency interval, and N denotes a number of hypotheses corresponding to one TTI.

17. The apparatus of claim 12, wherein the frequency offset and hypothesis estimator controls a residual frequency offset by reflecting the drawn frequency offset.

18. The apparatus of claim 12, further comprising:
a controller configured to control a residual frequency offset by an Auto Frequency Control (AFC) and control calculation of the ML values of the plurality of sub-frames through the ML value calculator when the maximum value of the ML values is equal to or smaller than the threshold.

19. The apparatus of claim 12, wherein, after determining that the frame synchronization acquisition is successful, the post processor completes the frame synchronization acquisition after a length corresponding to the frequency offset in a corresponding sub-frame.

20. The apparatus of claim 18, wherein, when the drawn hypothesis is not included in the hypothesis indicating the successful synchronization acquisition, the controller determines that the frame synchronization acquisition has failed and controls calculation of the ML values of the plurality of sub-frames through the ML value calculator after a length corresponding to the frequency offset in a corresponding sub-frame.

21. The apparatus of claim 20, wherein, when the drawn hypothesis is not included in the hypothesis indicating the successful synchronization acquisition, the post processor identifies whether a number of times that the synchronization acquisition is attempted exceeds a number of times, and determines that the frame synchronization acquisition has failed when the number of times that the synchronization acquisition is attempted exceeds the number of times.

22. The apparatus of claim 21, wherein, when the number of times that the synchronization acquisition is attempted does not exceed the number of times, the controller controls calculation of the ML values of the plurality of sub-frames through the ML value calculator.

* * * * *